March 3, 1970  P. L. POWELL  3,498,139
SPEEDOMETER

Filed Jan. 22, 1968  3 Sheets-Sheet 1

INVENTOR
Patrick L. Powell

By Norton Lesser,
Attorney

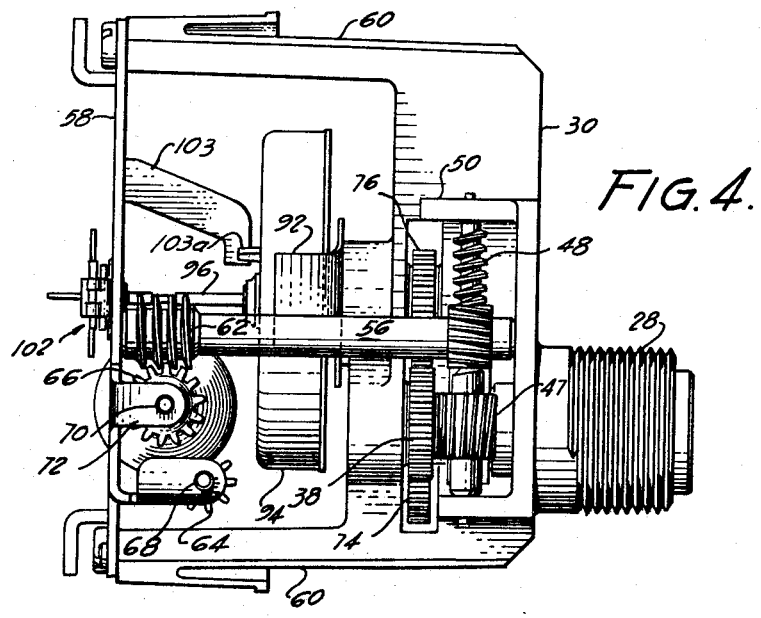
FIG. 4.
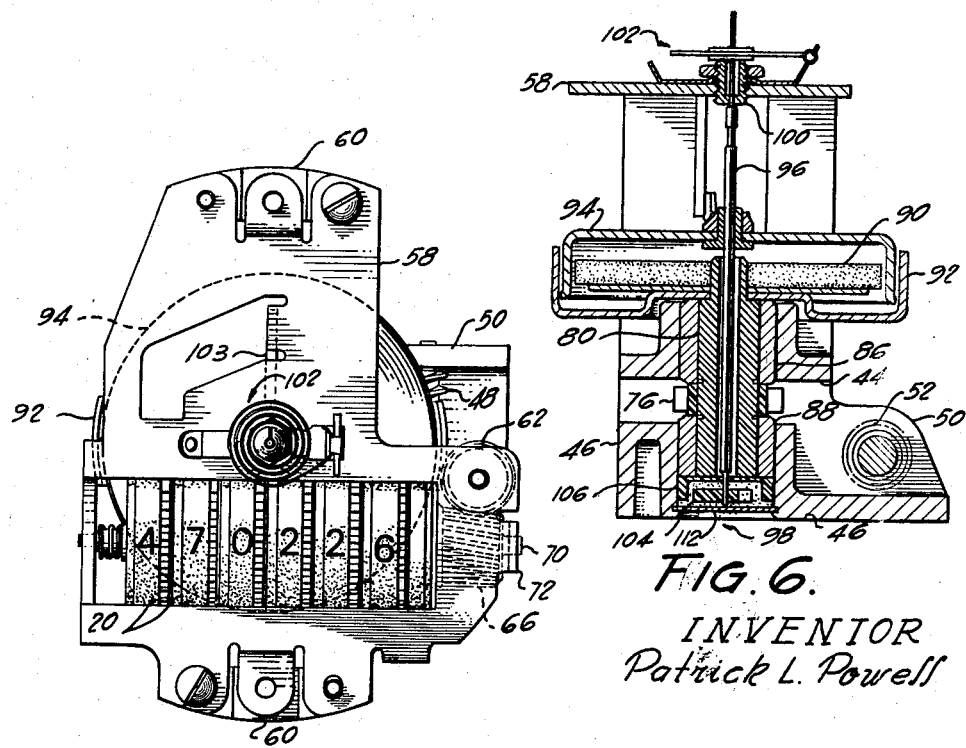
FIG. 5.
FIG. 6.
INVENTOR
Patrick L. Powell
By Norton Lesser.
Attorney INVENTOR
Patrick L. Powell By Norton Lesser
Attorney United States Patent Office 3,498,139
Patented Mar. 3, 1970

3,498,139
SPEEDOMETER
Patrick L. Powell, Franklin Park, Ill., assignor to Stewart-Warner Corporation, Chicago, Ill., a corporation of Virginia
Filed Jan. 22, 1968, Ser. No. 699,590
Int. Cl. G01p 3/22
U.S. Cl. 73—519                                    4 Claims

ABSTRACT OF THE DISCLOSURE

The following specification describes a speedometer utilizing an integral frame structure for rotatably supporting an input shaft driven by a flexible shaft, an idler shaft and magnet shaft in parallel relationship to permit coaxial independent journalling of the magnet and pointer shafts and avoid transmission of axial shaft loading. In additioni the iuput shaft transmits movement to a transverse shaft rotatably supported in the frame structure for driving an associated odometer.

BACKGROUND OF THE INVENTION

Field of the invention

This invention relates in general to bearing structures for instruments and more particularly to a speedometer magnet shaft and pointer shaft bearing assembly with a damping assembly provided adjacent one end of the pointer shaft.

Description of the prior art

Speedometers employ a rotatable magnet driven by a flexible shaft from either a vehicle transmission or wheel in accordance with the vehicle speed. The magnet is magnetically coupled to a rotatable speed cup or eddy cup which rotates to a position corresponding to the magnet speed for controlling a pointer to indicate the vehicle speed.

The magnet is staked on the end of a magnet shaft rotatably supported at only the driven end. The pointer shaft is journalled adjacent one end in a frame plate and the other end of the pointer shtaft is journalled in the cantilevered or unsupported end of the rotatable magnet shaft. Eccentricity in the rotation of the magnet shaft relative the pointer shaft and/or axial loading of the magnet shaft causes considerable stress and vibration in the pointer shaft bearing resulting in wear and failure.

Various remedies have been suggested for this problem. One remedy employs an arm extending from the housing and through an opening in the back wall of the speed cup for supporting the pointer shaft independently of the magnet shaft. However, this requires such an extensive opening in the speed cup to permit the required degree of movement that the speed cup is rendered too weak to resist the stresses occurring in operatioin.

Another remedy employs a pointer shaft offset from the magnet shaft with each shaft supported at both ends. This arrangement provides only a tangential magnetic field between the magnet and the speed cup so that the force transferred from the magnet to the speed cup is insufficient to provide the required movement.

Since the pointer shaft often also responds to ambient vibration, it is desirable to dampen the movement of the shaft to avoid the effect of ambient vibrations thereon. Usually a silicone damping fluid is provided intermediate the shaft ends to dampen the movement of the pointer shaft, however, leakage of the fluid over a period of time reduces the effectiveness of this technique.

SUMMARY OF THE INVENTION

The present invention is designed to provide independent bearing supports for both the magnet shaft and pointer shaft and still permit coaxial rotation of the pointer and magnet shaft for providing maximum magnetic coupling.

This is accomplished by supporting the magnet shaft in bearings on opposite sides of the position from which the shaft is driven so that the shaft is supported at spaced positions adjacent respective ends of the shaft. The magnet shaft is driven through a gear train from the drive tip of a flexible shaft with the gear train ensuring the proper direction of rotation of the magnet shaft. This arrangement avoids the transmission of axial loads to the magnet or pointer shafts such as may result from axial movement of the flexible shaft against the input shaft. The magnet is mounted at one end of the magnet shaft and the pointer shaft extends completely through the magnet and magnet shaft for support in independent bearings adjacent its opposite ends. The speed cup is mounted intermediate the ends of the pointer shaft and adjacent the magnet.

This arrangement permits the holes to be formed at properly spaced positions in an integral cast housing so that the holes are properly positioned relative each other and all shafts are properly aligned, and further permits a damping fluid to be sealed adjacent one end of the pointer shaft to avoid leakage.

It is therefore one object of the present invention to provide a vehicle speedometer with improved durability.

It is another object of the present invention to provide an improved damping assembly for a speedometer pointer shaft.

It is still another object of the present invention to provide an improved vehicle speedometer.

Other objects and features of the present invention will become apparent on examination of the following specification and claims together with the drawings.

BRIEF DESCRIPTION OF THE DRAWINGS

FIGURE 4 is a side elevational view of the speedometer with the dial, pointer and attendant housing apparatus omitted;

FIGURE 5 is a front elevational view of the portion of the speedometer shown in FIGURE 4;

FIGURE 6 is a sectional view taken along the line 6—6 in FIGURE 5;

DESCRIPTION OF THE PREFERRED EMBODIMENT

Figure 1:
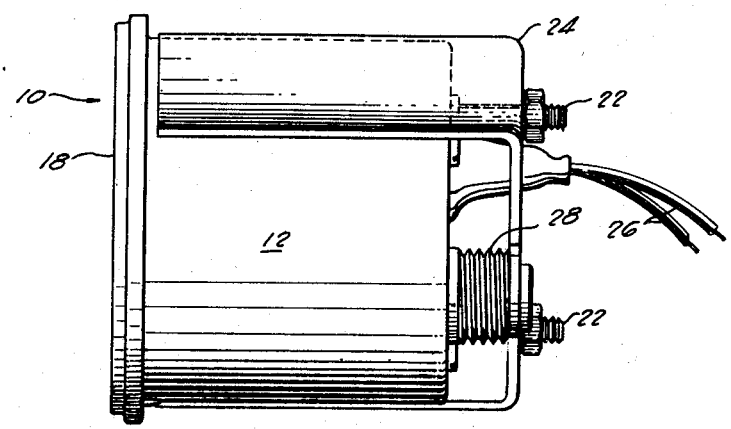
FIGURE 1 is a side elevational view of a speedometer incorporating the principles of the present invention.
Figure 2:
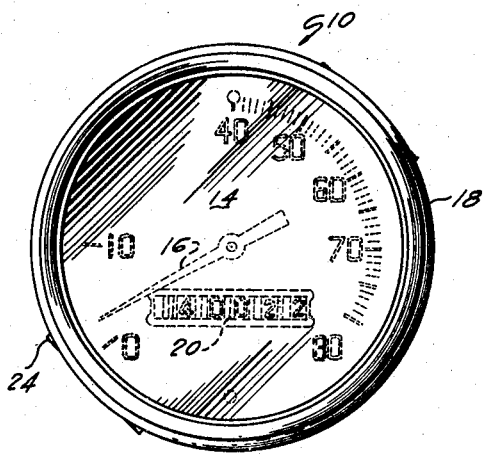
FIGURE 2 is a front elevational view of the speedometer shown in FIGURE 1.
Figure 3:
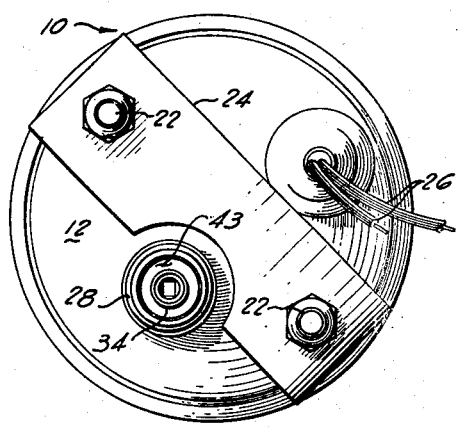
FIGURE 3 is a rear elevational view of the speedometer shown in FIGURE 1.

Referring to FIGURES 1, 2 and 3, a vehicle speedometer is indicated therein by the reference character 10. The speedometer includes a cup-shaped housing 12 and a dial 14 at the open or front end of the housing. The dial 14 is marked with indicia corresponding to different increments of vehicle speed, and a pointer or indicator needle 16 is adapted to sweep over the indicia for indicating the vehicle speed. A glass plate is mounted in front of the dial 14 at the end of the housing 12 by means of a bezel 18 for protecting the dial and pointer. The dial 14 is also provided with an opening through which a series of odometer wheels 20 are visible for the purpose of indicating vehicle mileage.

The rear end of the housing carries a pair of studs 22 on which a U-shaped clamping bracket 24 is mounted. The bracket 24 draws the bezel 18 at the front of the speedometer housing 12 tight against a panel in which the speedometer is mounted in response to nuts on the studs 22 being tightened against the bracket 24. A pair of leads 26 extending through the rear of the housing 12 furnish electrical power to a lamp, not shown, in the housing for lighting the dial 14, for example, when needed.

Figure 9:
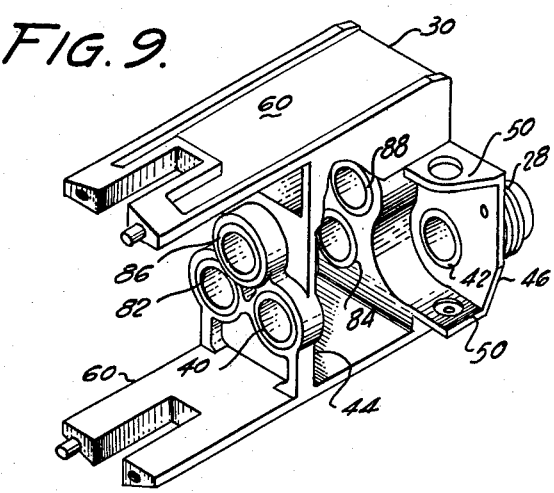
FIGURE 9 is an isometric view of the integral frame in which the magnet shaft, idler shaft and input shaft are mounted.

A threaded boss 28 extends through the back wall of the cup-shaped housing 12. The boss is formed at the rear of a generally U-shaped frame 30, best seen in FIGURES 4 and 9. Boss 28 permits the ferrule, shown in part in FIGURE 7, of a flexible shaft casing, not shown, to be fastened to the speedometer. The casing carries a flexible shaft 32 seen in FIGURE 7, which is rotated from a remote position such as the vehicle transmission or wheel in accordance with the vehicle speed.

The end of shaft 32 is out of round or noncircular and engages either directly in a similar shaped opening of an input shaft 34 or through a coupling element, not shown, which engages in the input shaft opening. The input shaft 34 carries both a worm gear 36 and a moulded pinion gear 38 in axially adjacent positions and intermediate the shaft ends. The ends of shaft 34 are journalled in respective bushings 40 and 42 located in appropriate openings of two spaced rear legs 44 and 46 of U-shaped frame 30 so that the shaft 34 is supported on both sides of the gears. A seal 43 is located behind the bearing 42 to prevent the entrance of dirt.

Figure 7:
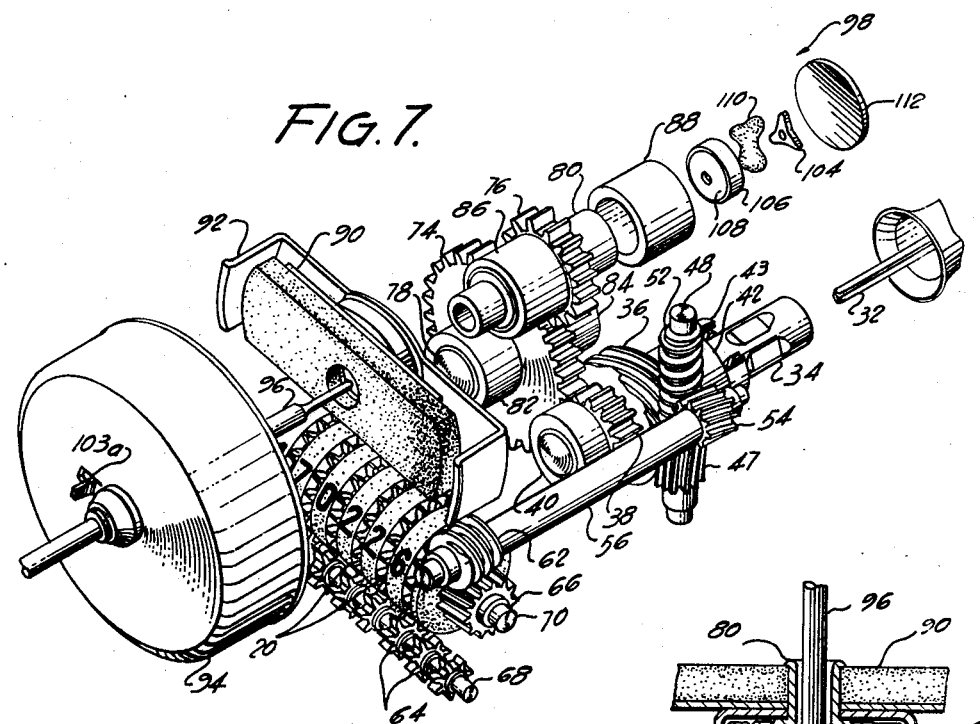
FIGURE 7 is a partially exploded isometric view illustrating the relationship between the important portions of the speedometer.
Figure 8:
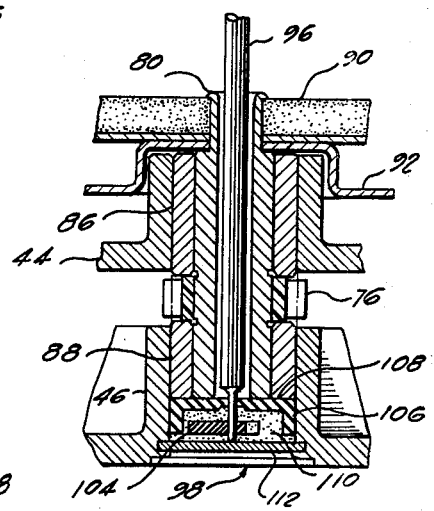
FIGURE 8 is a fragmentary sectional view showing details of the pointer shaft damping assembly.

Gear 36 meshes with a moulded gear 47 mounted on a vertical shaft 48, as seen in FIGURE 7, whose opposite ends are journalled in horizontal arms 50 formed on the rear leg 46 of frame 30. A second moulded gear 52 on shaft 48 engages a moulded gear 54 on an elongate horizontal shaft 56. Shaft 56 is journalled at one end in the back wall 46 of the offset U-shaped frame portion and the other end of shaft 56 is journalled in a bracket 58 mounted on the ends of side legs 60 of the U-shaped frame 30, best seen in FIG. 4. A second gear 62 on shaft 56 serves to drive the odometer wheels 20 together with their respective pinions 64 through drive gear 66. The pinions 64 are mounted on a shaft 68 journalled between a pair of arms formed on bracket 58, while the wheels 20 and drive gear 66 are mounted on a shaft 70 supported between arms 72 formed on the bracket 58.

Gear 38 meshes with a large diameter idler gear 74 located between the leg 44 and a thickened portion of rear leg 46 of the frame 30. Gear 74 in turn drives a magnet shaft gear 76 also located between the leg 44 and the thickened portion of leg 46. Gear 38 may thus shift axially somewhat in response to loading by the flexible shaft without loading the magnet shaft, since as seen in the drawings, gears 38, 74 and 76 are spur gears with the teeth of gears 38 and 74 engaging or meshing along generally parallel planes and the teeth of gears 74 and 76 engaging along respective generally parallel planes. Gears 74 and 76 are mounted on respective shafts 78 and 80 parallel to the input shaft 34 with gear 74 serving to drive the magnet shaft 80 in the proper direction of rotation. Both shafts 78 and 80 are supported at opposite ends in respective bushings 83, 84, 86 and 88 located in appropriate apertures of the two rear frame legs 44 and 46. It will be noted that the shafts are supported in the bearings on opposite sides of the respective gears by rear legs 44 and 46 to minimize the effect of unbalance forces on the shafts, while the integral frame 30 permits the shaft apertures to be properly and accurately aligned during manufacture. A portion of the structure joining the top of legs 44 and 46 to each other is broken away in FIG. 9 to more clearly illustrate the relationship of the apertures in which the bearings are seated.

To assemble the shafts 34, 78 and 80, the bushings are inserted in the respective apertures in legs 44 and 46. The gear 76 is positioned between legs 44 and 46 and the respective shaft 80 is then inserted through the bushings and gear with the gear being press fit on the shaft. Likewise, gears 36, 38 and 74 are positioned between legs 44 and 46 and the respective shafts 34 and 78 inserted through the respective bushings and gears with the gears being press fit thereon.

The magnet shaft 80 is hollow and at one end thereof a magnet 90, together with a U-shaped field piece 92, are fastened for the purpose of driving an aluminum speed cup 94. The speed cup rim nests between the arms of the field piece 92 and the ends of magnet 90 and the back wall of the cup is fastened intermediate the ends of a pointer shaft 96. Pointer shaft 96 passes through an opening in the magnet and field piece and through the hollow magnet shaft 80 with at least .02" clearance so that the speed cup and magnet are coaxial to provide maximum coupling torque, but the pointer shaft 96 does not engage the inner surface of the magnet shaft 80 so that one is unaffected by any eccentricity in the other.

One end of the pointer shaft 96 is journalled in a stationary damping assembly 98 and adjacent the other end in a bearing 100 carried by the frame plate 58 as best seen in FIGURE 6. The other end of the pointer shaft 96 extends through bracket 58 and carries the indicator 16. Both the indicator 16 and the shaft are biased to a zero or home position by a conventional adjustable torsion spring arrangement 102. A stop 103 formed on bracket 58 engages a projection 103a on the speed cup to limit movement of the cup and pointer.

The damping assembly 98 comprises a three toothed paddle wheel 104 fixed to the end of the pointer shaft 96. A cup-shaped housing 106 is located behind the magnet shaft 80 and press fit in the corresponding aperture in rear leg 46. The back wall 108 of the housing 106 seats against both the rear of the shaft 80 and bearing 86 and serves to journal the pointer shaft 96 with less than .001" clearance while providing an enclosure for a silicone damping fluid 110 deposited in the cup. The small clearance of the shaft serves to confine the fluid against leakage through the journal opening. The end of the shaft 96 bears against a thrustplate 112 fastened in the end of the magnet shaft aperture in leg 46 and closing the open end of housing 106 to seal the housing against fluid leakage. About .003 to .007 end play is provided for the pointer shaft as determined by the adjustment of threaded bearing 100 which is threaded into frame plate 58 against a shoulder at the corresponding end of shaft 96 to provide the desired play.

In the described speedometer, rotational movement transmitted from the flexible shaft 32 rotates the input shaft 34, together with gears 36 and 38. Gear 36 rotates gears 47 and 52 to in turn drive shaft 56. Shaft 56 in turn drives the odometer wheels 20 and pinions 64 through shafts 52 and 70 to register the distance traversed by the vehicle in which the speedometer is mounted.

Gear 38 in the meantime rotates gears 74 and 76 to rotate the magnet 90 and field piece 92 to in turn pivot the speed cup 94, pointer shaft 96 and indicator 16 for indicating the vehicle speed. Momentary or instantaneous changes in the position of the pointer shaft and indicator 16 are restrained by the action of the paddlewheel 104 in the fluid 110 of the damping assembly 98. It will be noted that the magnet shaft 80 and pointer shaft 96 are independently supported at spaced positions to provide an extremely long lived reliable speedometer.

The inventive concepts incorporated in the foregoing description are believed set forth in the accompanying claims.

What is claimed is:

1. A speedometer adapted to be driven by a rotatable flexible shaft for indicating vehicle speed and having an odometer associated therewith for indicating vehicle mileage, comprising a hollow magnet shaft, bearing means rotatably supporting said shaft adjacent opposite ends, a gear fixed to said magnet shaft intermediate said bearing means, an input shaft parallel to said magnet shaft and rotated by said flexible shaft, bearing means rotatably supporting said input shaft adjacent opposite ends of said input shaft, a pair of axially spaced adjacent gears carried by said input shaft intermediate said input shaft bearing means for rotation with said input shaft, an idler shaft parallel to said input and magnet shafts, bearing means rotatably supporting said idler shaft adjacent opposite ends, a gear on said idler shaft intermediate said input shaft ends for engaging said magnet shaft gear and one of said input shaft gears along respective parallel planes for rotating said magnet shaft gear and magnet shaft in response to the rotation of said input shaft by said flexible shaft while avoiding the transmission of axial loads to said magnet shaft from said input shaft, a magnet fixed to said magnet shaft, a biased pointer shaft extending through said magnet shaft and fixedly carrying a speed cup intermediate the ends of said pointer shaft for magnetic coupling with said magnet, means rotatably supporting said pointer shaft adjacent opposite ends for independent coaxial rotation with said magnet shaft in response to the rotation of said magnet by said magnet shaft for indicating the speed of said vehicle in accordance with the position to which said speed cup is driven by said magnet, a shaft transverse to said input shaft, a gear on said transverse shaft engaging the other gear on said input shaft for rotating said transverse shaft to drive said odometer with the engagement between said input shaft other gear and said transverse shaft gear placing said input shaft under axial load, and a common integrally formed frame for supporting said transverse shaft for rotation and for supporting each of said bearing means.

2. The speedometer claimed in claim 1 in whihc said common integrally formed frame comprises a pair of spaced legs for receiving said input shaft one gear and said idler and magnet shaft gears therebetween with each leg having a respective aligned opening for said magnet, input and idler shafts and the respective bearing means.

3. In the speedometer claimed in claim 2, a cup-shaped bearing for one end of said pointer shaft located in one opening in one of said legs with the back wall of said bearing engaging one end of said magnet shaft to restrain axial movement of said magnet shaft in one direction, a silicone fluid carried by said cup, a paddle fixed to said pointer shaft and located in said fluid for dampening the effect of ambient vibrations on said pointer shaft, and a thrust plate for said pointer shaft having a periphery completely engaged with the surface of said opening in said one leg for sealing the open end of said cup-shaped bearing.

4. A speedometer adapted to be driven from a flexible shaft for indicating vehicle speed and having an odometer associated therewith for indicating vehicle mileage, comprising an input shaft, means rotatably supporting said input shaft adjacent opposite ends for rotation by said flexible shaft, a pair of gears carried by said input shaft intermediate said opposite ends, a hollow magnet shaft parallel to said input shaft, a gear carried by said magnet shaft intermediate the ends of said magnet shaft, means engaging one of said pair of gears and said magnet shaft gear along respective generally parallel planes for rotating said magnet shaft in response to rotation of said input shaft while permitting axial movement of said input shaft independently of said magnet shaft, means supporting said magnet shaft for rotation on opposite sides of said magnet shaft gear, a magnet adjacent one end of said magnet shaft, a biased pointer shaft extending through said magnet shaft and fixedly carrying a speed cup intermediate the ends of said pointer shaft for magnetic coupling with said magnet, means rotatably supporting said pointer shaft adjacent opposite ends for independent coaxial rotation with said magnet shaft in response to the rotation of said magnet for indicating the speed of said vehicle in accordance with the position to which said speed cup is driven by said magnet, a shaft transverse to said input and magnet shafts and having a gear thereon for engagement with the other gear of said input shaft for driving said odometer in response to rotation of said input shaft, and a common integrally formed body for rotatably supporting said transverse shaft and for carrying each of said supporting means for said input and magnet shafts.

References Cited

UNITED STATES PATENTS

| | | | |
|---|---|---|---|
| 806,363 | 12/1905 | Porter et al. | 73—519 |
| 1,351,585 | 8/1920 | Poole | 73—519 |
| 1,396,081 | 11/1921 | Wood | 73—520 |
| 1,415,079 | 5/1922 | Wood | 73—520 |
| 3,114,880 | 12/1963 | Medlar | 73—430 |
| 3,196,692 | 7/1965 | Jensen | 73—519 |
| 3,419,027 | 12/1968 | Von Koch | 73—519 |

JAMES J. GILL, Primary Examiner

HERBERT GOLDSTEIN, Assistant Examiner